(12) United States Patent
Li et al.

(10) Patent No.: US 10,871,703 B2
(45) Date of Patent: Dec. 22, 2020

(54) MULTI-LENS CAMERA

(71) Applicant: HANGZHOU HIKVISION DIGITAL TECHNOLOGY CO., LTD., Hangzhou (CN)

(72) Inventors: Yang Li, Hangzhou (CN); Caisheng Yan, Hangzhou (CN); Zhiqiang Rong, Hangzhou (CN); Zhan Ye, Hangzhou (CN); Peng Xu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/467,798

(22) PCT Filed: Aug. 3, 2018

(86) PCT No.: PCT/CN2018/098497
§ 371 (c)(1),
(2) Date: Jun. 7, 2019

(87) PCT Pub. No.: WO2019/128231
PCT Pub. Date: Jul. 4, 2019

(65) Prior Publication Data
US 2020/0174343 A1    Jun. 4, 2020

(30) Foreign Application Priority Data

Dec. 27, 2017 (CN) .......................... 2017 1 1452642

(51) Int. Cl.
*G03B 15/03* (2006.01)
*G03B 17/12* (2006.01)
(52) U.S. Cl.
CPC ............. *G03B 15/03* (2013.01); *G03B 17/12* (2013.01)

(58) Field of Classification Search
USPC ....................................................... 396/155
See application file for complete search history.

(56) References Cited

U.S. PATENT DOCUMENTS 9,829,773 B2    11/2017  Bergsten et al.
10,223,885 B2 *  3/2019  Larsson ............... H04N 5/2256
(Continued)

FOREIGN PATENT DOCUMENTS

CN     206020902    3/1917
CN     206181179    5/1917
(Continued)

OTHER PUBLICATIONS

Office Action and Search Report Issued in Corresponding Chinese Patent Application No. 2017114526425, dated Dec. 26, 2019.
(Continued)

*Primary Examiner* — Clayton E. LaBalle
*Assistant Examiner* — Warren K Fenwick
(74) *Attorney, Agent, or Firm* — Norton Rose Fulbright US LLP

(57) ABSTRACT

The present application discloses a multi-lens camera, comprising a camera body and a light supplementing device; wherein, the camera body comprises a body shell assembly, lenses, an lens regulator and a transparent cover that is installed on the body shell assembly; the lens regulator is installed within a space formed by the body shell assembly and the transparent cover; the transparent cover comprises a flat portion and a curved portion surrounding the flat portion; the lenses are located within a space covered by the curved portion; the lens regulator comprises a fixing disc and at least two lens brackets; each of the lens brackets comprises a first bracket configured for mounting a lens; the first bracket is movably provided on the fixing disc, and is movable along the circumference of the fixing disc; the light (Continued)

supplementing device surrounds and is located outside of the camera body to provide fill light.

20 Claims, 8 Drawing Sheets

(56) References Cited

U.S. PATENT DOCUMENTS

| | | | | |
|---|---|---|---|---|
| 10,304,300 | B2 * | 5/2019 | Hertzman | H04N 5/2253 |
| 2007/0295893 | A1 * | 12/2007 | Olsen | H04N 9/09 |
| | | | | 250/226 |
| 2015/0177596 | A1 | 6/2015 | Bergsten et al. | |
| 2015/0358538 | A1 * | 12/2015 | Donaldson | G03B 17/55 |
| | | | | 348/38 |
| 2016/0100086 | A1 * | 4/2016 | Chien | G01J 5/0025 |
| | | | | 348/143 |
| 2017/0255083 | A1 | 9/2017 | Donaldson | |
| 2018/0241915 | A1 * | 8/2018 | Guan | G03B 37/04 |

FOREIGN PATENT DOCUMENTS

| | | |
|---|---|---|
| CN | 105715918 | 9/1917 |
| CN | 201247380 | 5/2009 |
| CN | 202735674 | 2/2013 |
| CN | 102333187 | 4/2013 |
| CN | 103118243 | 5/2013 |
| CN | 104880211 | 9/2015 |

OTHER PUBLICATIONS

International Search Report issued in Corresponding International Patent Application No. PCT/CN2018/098497, dated Oct. 25, 2018.
Extended European Search Report issued in Corresponding European Application No. 18880064.3, dated Mar. 20, 2020.
Notification to Grant Patent Right for Invention issued in Corresponding Chinese Application No. 201711452642.5, dated May 29, 2020 (English Translation Provided).

* cited by examiner

MULTI-LENS CAMERA

CROSS-REFERENCE TO RELATED APPLICATIONS

The present application is a national phase under 35 U.S.C. § 371 of International Application No. PCT/CN2018/098497, filed Aug. 3, 2018, which claims priority to Chinese Patent Application No. 201711452642.5, filed with the China National Intellectual Property Administration on Dec. 27, 2017 and entitled "multi-lens camera", each of which are incorporated into the present application by reference in their entirety.

TECHNICAL FIELD

The present application relates to a technical field of camera fill light design, and in particular, to a multi-lens camera.

BACKGROUND

A multi-lens camera, as typically used in image acquisition, has a plurality of lenses distributed on the camera body along the circumference thereof. Each of the lenses can be independently subjected to a three-axis adjustment so as to acquire images with a wide angle or a specific angle. Images captured by the plurality of lenses can constitute a panoramic image for the multi-lens camera.

During the operation in a dark environment (e.g., in a cloudy day, at night or in a case of light insufficiency), fill light may be required by the multi-lens camera for image acquisition. At present, a multi-lens camera is provided with an external light supplementing device that is independent of the camera body. Thus, a large installation space has to be occupied. Moreover, cables may be excessive and complicated. Obviously, the large installation space and cumbersome on-site installation required by a light supplementing device for a multi-lens camera will undoubtedly bring trouble to installation personnel.

SUMMARY

An embodiment of the application provides a multi-lens camera to solve the problems of a large installation space and cumbersome installation required by an existing light supplementing device.

A multi-lens camera, comprising a camera body and a light supplementing device; wherein, the camera body comprises a body shell assembly, lenses, an lens regulator and a transparent cover that is installed on the body shell assembly; the lens regulator is installed within a space formed by the body shell assembly and the transparent cover; the transparent cover comprises a flat portion and a curved portion surrounding the flat portion; the lenses are located within a space covered by the curved portion; the lens regulator comprises a fixing disc and at least two lens brackets; each of the lens brackets comprises a first bracket configured for mounting a lens; the first bracket is movably provided on the fixing disc, and is movable along the circumference of the fixing disc; the light supplementing device surrounds and is located outside of the camera body to provide fill light.

The technical solution employed by the embodiment of the present application has some benefits and advantages.

In the multi-lens camera as disclosed in the embodiment of the present application, the light supplementing device 100 can be assembled on the camera body 200, so that a multi-lens camera is provided with integrated functions of both image acquisition and light fill-in. Compared with an independent light supplementing device as utilized in the prior art, the space occupied by the light supplementing device is reduced, and the installation operation of an operator can be simplified. The light supplementing device disclosed in the embodiment of the present application can solve problems of a large installation space and cumbersome installation as required by an existing independent light supplementing device.

BRIEF DESCRIPTION OF THE DRAWINGS

In order to illustrate the technical solutions in the embodiments of the present application or in the prior art more clearly, the drawings used in the embodiments or in the prior art will be briefly described below. Obviously, the drawings described below are just for some embodiments of the present application and other drawings may be obtained by those of ordinary skills in the art based on these drawings without any creative effort.

DESCRIPTION OF REFERENCE SIGNS

Figure 1:
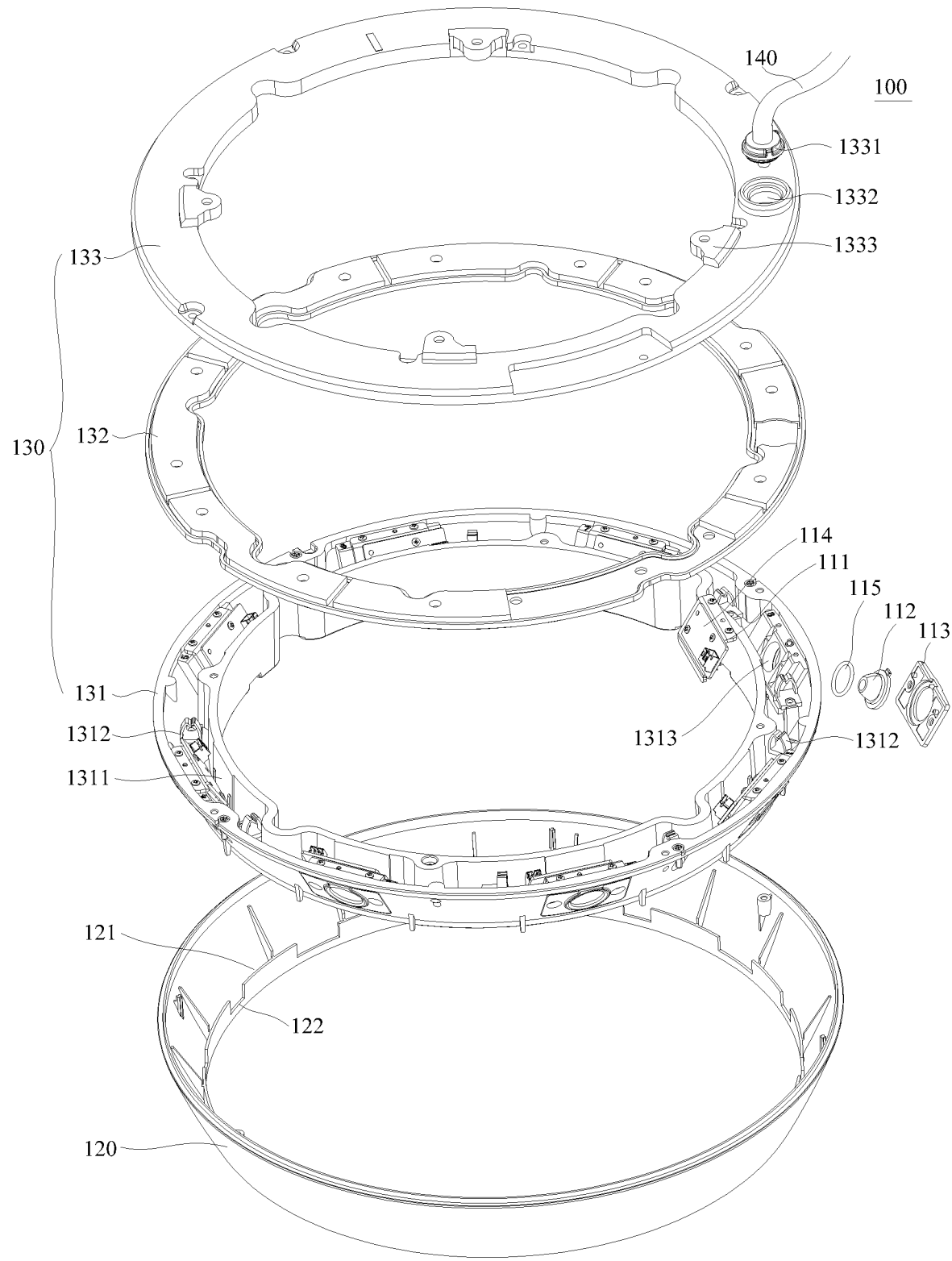
FIG. 1 is an exploded schematic view showing the structure of a light supplementing device of a multi-lens camera according to an embodiment of the present application.
Figure 2:
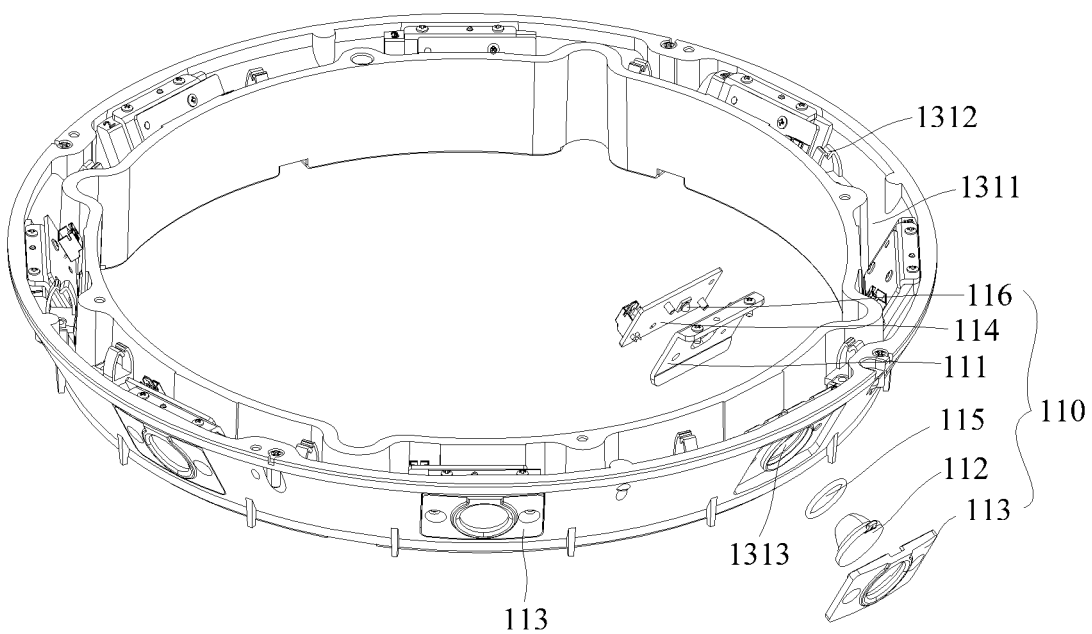
FIG. 2 is a schematic view of a part of the structure as shown in FIG. 1 from another perspective.

100—light supplementing device; 110—fill lamp; 111—sheet metal heat dissipater; 112—lamp lens; 113—lens cover; 114—lamp panel; 115—seal; 116—lamp body; 120—annular optically transparent cover; 121—positioning groove; 122—drain notch; 130—annular lamp holder; 131—annular base; 1311—receiving groove; 1312—cable clip; 1313—installation hole; 132—annular gasket; 133—annular lamp cover; 1331—sealing cable clip, 1332—threading hole; 1333—connection tab; 140—fill cables;

200—camera body; 210—threaded connector; 220—body shell assembly; 230—lens; 240—transparent cover; 241—flat portion; 242—curved portion; 250—lens regulator; 251—fixing disc; 2511—first tooth slot; 2512—avoidance hole; 252—lens bracket; 2521—first bracket; 2521a—first meshing tooth; mounting plate; 2521b—elastic connection portion; 2521c—first catch; 2521d—connection base; 2521e—first tightening protrusion; 2521f—second elastic arm; 2522—second bracket;

300—mounting plate; 310—connection post.

DETAILED DESCRIPTION

In order to make the objectives, technical solutions, and advantages of the present application clearer, the present application will be described in more detail below with reference to the drawings and embodiments. Obviously, the described embodiments are merely a part of rather than all of the embodiments of the present application. All other embodiments obtained by those skilled in the art based on the embodiments of the present application without any creative effort fall within the protection scope of the present application.

Technical solutions provided by various embodiments of the present application will be described in detail below with reference to the drawings.

Referring to FIGS. 1-9, an embodiment of the present application discloses a multi-lens camera. The multi-lens camera includes a light supplementing device 100 and a camera body 200. The camera body 200 includes a body shell assembly 220, lenses 230, and a transparent cover 240 installed on the body shell assembly 220, and an lens regulator 250. The lens regulator 250 is installed within a space formed by the transparent cover 240 and the body shell assembly 220. The lenses 230 are installed on the lens regulator 250 and are located within a space covered by a curved portion 242.

The transparent cover 240 includes a flat portion 241 and the curved portion 242 surrounding the flat portion 241. In a specific implementation, the flat portion 241 is centered and the curved portion 242 is arranged to surround the flat portion 241.

The lens regulator 250 as disclosed includes a fixing disc 251 and at least two lens brackets 252. The fixing disc 251 serves as a base for installation of the lens brackets 252 and the lenses 230. The lenses 230 are provided on the fixing disc 251 through the lens brackets 252.

The lens bracket 252 include a first bracket 2521, which is configured for mounting a lens 230 and is movably provided on the fixing disc 251 so as to be movable along the circumference of the fixing disc 251. The movement of the first bracket 2521 can drive the lenses 230 to move, thereby the position of the lens 230 on the fixing disc 251 can be adjusted.

The light supplementing device 100 surrounds and is located outside of the camera body 200 to provide fill light for the camera body 200 to acquire images.

The light supplementing device 100 disclosed in the embodiment of the present application can be assembled to the camera body 200, so that a multi-lens camera is provided with integrated functions of both image acquirisition and light fill-in. Compared with an independent light supplementing device as utilized in the prior art, the space occupied by the light supplementing device is reduced, and the installation operation by an operator can be simplified. The light supplementing device disclosed in the embodiment of the present application can solve problems of a large installation space and cumbersome installation as required by an existing independent light supplementing device.

Meanwhile, the transparent cover 240 of the multi-lens camera includes a flat portion 241 and a curved portion 242 surrounding the flat portion 241, and the lenses 230 are located within a space covered by the curved portion 242. The curved structure of the transparent cover 240 can improve the anti-vibration performance thereof. In actual use, the lens regulator 250 can also be used to adjust the positions of the lenses 230. As such, the adjustment of the lenses 230 is enabled in P-direction. In other words, the lenses 230 are movable in a plane parallel to the fixing disc 251.

In the multi-lens camera disclosed in the embodiment of the present application, the light supplementing device 100 may include a plurality of fill lamps 110, an annular optically transparent cover 120 and an annular lamp holder 130 to be installed on the camera body 200 of the multi-lens camera.

The annular lamp holder 130 serves as a base for installation of the plurality of fill lamps 110. The annular lamp holder 130 is sleeved outside of the plurality of lenses 230 of the camera body 200, so as to provide fill light for the plurality of lenses 230. The annular lamp holder 130 has an annular inclined installation surface. The plurality of fill lamps 110 are distributed along the circumference of the inclined installation surface. The annular optically transparent cover 120 is provided to cover the plurality of fill lamps 110. The annular optically transparent cover 120 can be used to provide protection and transfer the fill light from the light supplementing device 100.

In the light supplementing device 100 of the multi-lens camera according to the embodiment of the present application, the annular lamp holder 130 is installed on the camera body 200 and is external to the plurality of lenses 230. The plurality of fill lamps 110 are installed on the annular inclined installation surface of the annular lamp holder 130. The annular optically transparent cover 120 is provided to cover the plurality of fill lamps 110, such that the plurality of fill lamps 110 can provide fill light for the plurality of lenses of the multi-lens camera.

The annular lamp holder 130 may include an annular base 131 and an annular lamp cover 133. The annular lamp cover 133 is installed on the camera body 200 of the multi-lens camera. The annular base 131 is provided with a receiving groove 1311, and the annular lamp cover 133 is provided to sealing cover the opening of the receiving groove 1311. Fill cables 140 connected to the fill lamps 110 are arranged in the receiving groove 1311, and supply power to the fill lamps 110. In the above structure, the receiving groove 1311 can facilitate the routing of the fill cables 140 for the light supplementing device 100. In order to provide protection against dust or water, the annular lamp holder 130 in the embodiment of the present application may further include an annular gasket 132, through which the annular lamp cover 133 is sealingly connected to the annular base 131. The annular lamp cover 133 is sealingly connected to the annular base 131 by the annular gasket 132. This can ensure the sealing of the receiving groove 1311.

With the above structure, the light supplementing device 100 in the embodiment of the present application may have an improved explosion-proof capability. As such, the multi-lens camera has an improved capability of image acquisition in an explosive atmosphere.

Figure 4:
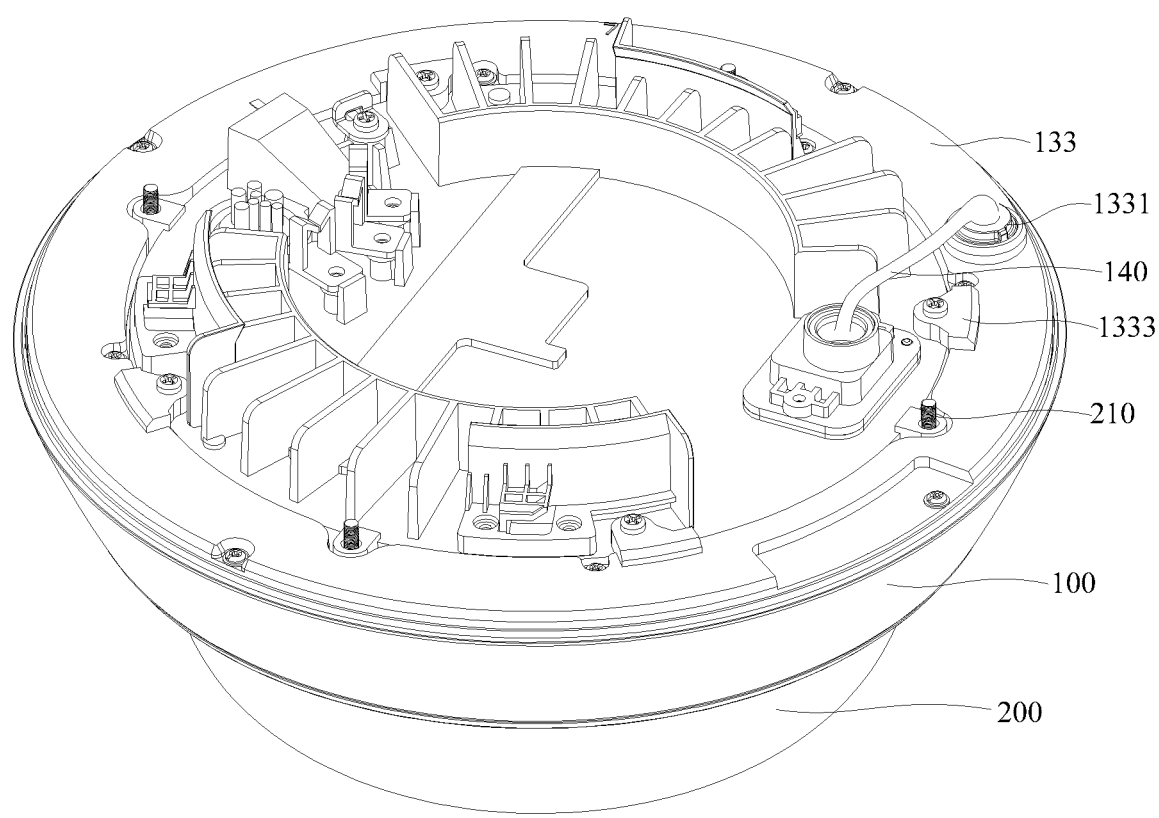
FIG. 4 is a schematic view showing the assembly of a part of the structure of the multi-lens camera shown in FIG. 3.
Figure 5:
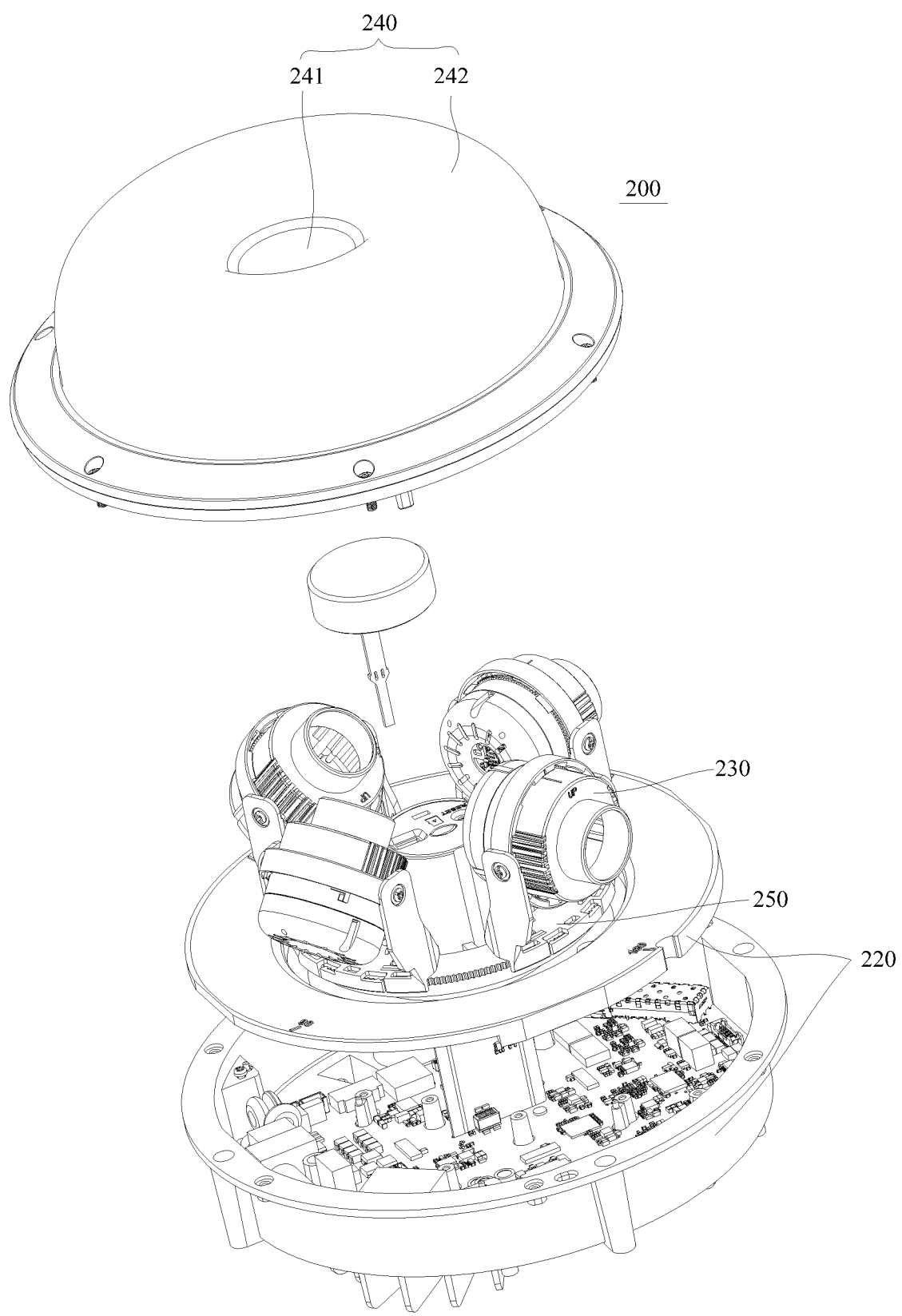
FIG. 5 is an exploded schematic view of the structure of a camera body of a multi-lens camera according to an embodiment of the present application.
Figure 6:
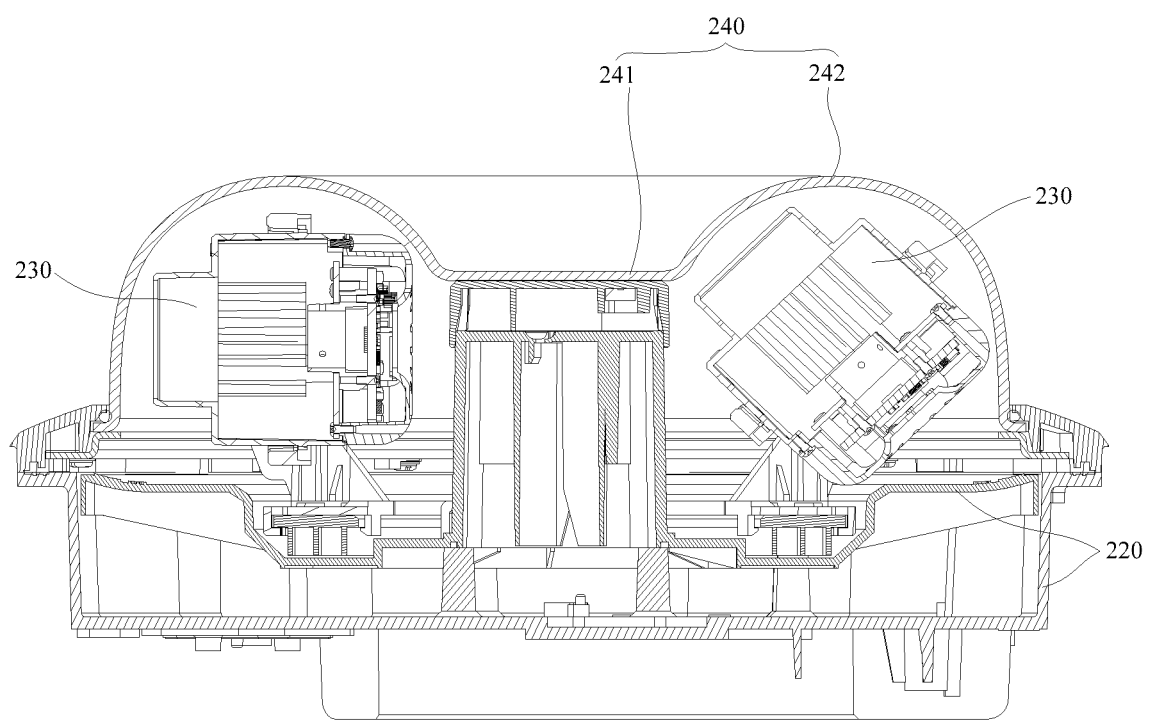
FIG. 6 is a cross-sectional view of a camera body of a multi-lens camera according to an embodiment of the present application.
Figure 7:
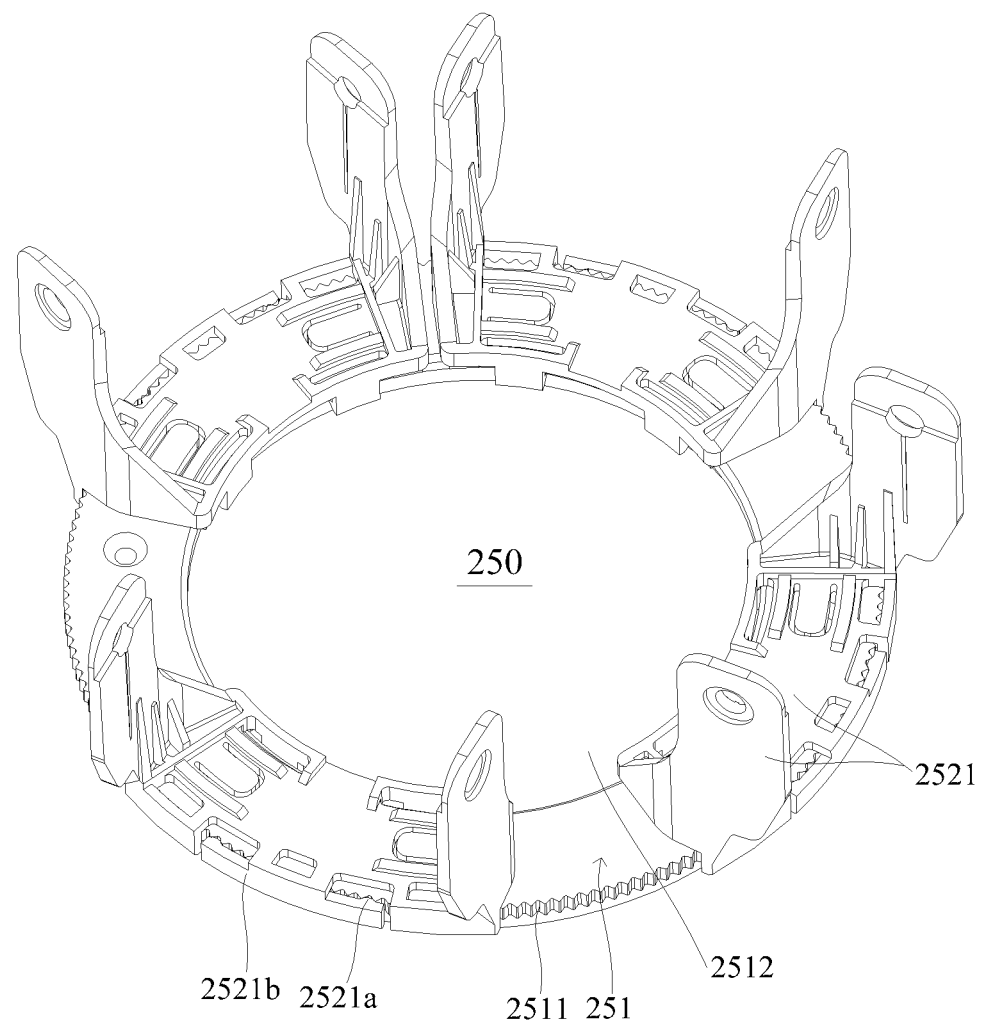
FIG. 7 is a schematic structural view of an lens regulator according to an embodiment of the present application.
Figure 8:
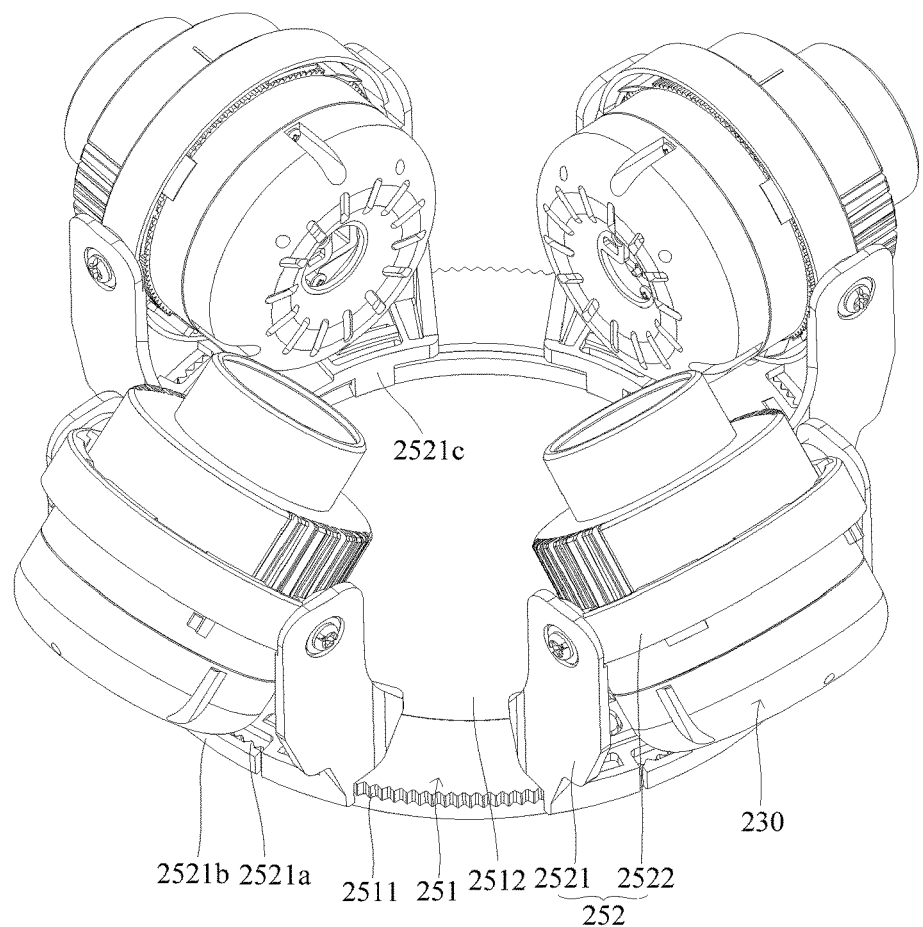
FIG. 8 is a schematic structural view of an lens regulator installed with lenses according to an embodiment of the present application.
Figure 9:
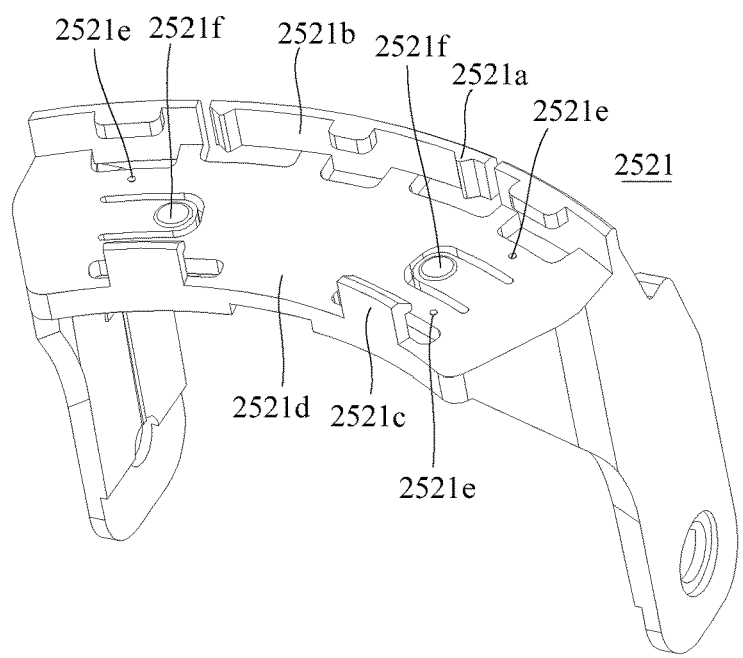
FIG. 9 is a schematic structural view of a first bracket according to an embodiment of the present application.

Generally, the light supplementing device 100 has an external power supply. Therefore, the annular lamp cover 133 and the annular gasket 132 may be provided with a threading hole 1332 for allowing passage of cables 140. The fill cables 140 are provided to extend through the threading hole 1332, such that the external power supply is electrically connected to the fill lamps 110. Generally, the power supply (which may be a power line or a battery) is arranged within the camera body 200, as shown in FIG. 4. In this case, the cables 140 are provided to extend into the light supplementing device 100 to obtain power at one end, and into the camera body 200 to supply power at the other end.

In order to ensure the sealing at the threading hole 1332, in a preferred solution, the threading hole 1332 is provided with a sealing cable clip 1331, which is sealingly engaged with the threading hole 1332 and allows for sealing passage of the fill cables 140.

As described above, there are a plurality of fill lamps 110. In order to facilitate the routing of the fill cables 140 in the receiving groove 1311, in a preferred implementation, a cable clip 1312 may be provided in the receiving groove 1311 to fix the fill cables 140, so that the orientation of the fill cables can be better arranged to avoid a mess of routing.

The receiving groove 1311 may have various structures. Returning to FIGS. 1 and 2, the receiving groove 1311 may have a flared structure the width of which gradually increases. In a specific implementation, the annular base 131 may include an annular inner wall 1314 and an annular outer wall 1315. The annular inner wall 1314 and the annular outer wall 1315 may be connected at one end, and obliquely extended away from each other at the other end. Through the above arrangement of the annular inner wall 1314 and the annular outer wall 1315, the receiving groove 1311 has a flared structure. The above structured receiving groove 1311 is small in volume, but its flared end is provided with sufficient space for connection with the annular lamp cover 133.

Specifically, the annular base 131 may have a V-shaped cross section, and the receiving groove 1311 may be V-shaped. The V-shaped groove can form an annular inclined installation surface.

Referring to FIGS. 1 and 3 again, the annular optically transparent cover 120 is arranged on the annular lamp holder 130. The inner wall of the annular optically transparent cover 120 may be provided with a positioning groove 121 that is engaged with the bottom of the annular lamp holder 130 for positional restriction, such that the annular optically transparent cover 120 cannot move towards the annular lamp holder 130.

In order to achieve a more stable engagement, in a preferred solution, the positioning groove 121 may be an annular groove extending along the bottom edge of the annular optically transparent cover 120. Generally, the axial direction of the light supplementing device 100 is vertical with the opening of the positioning groove 121 facing upward, thus waterlogging is more likely to occur in the positioning groove 121. In order to avoid waterlogging, in a preferred solution, the annular groove is provided with a plurality of drain notches 122 on its circumference. The plurality of drain notches 122 can drain the water in the positioning groove 121 in time.

In order to achieve more uniform fill light, in a preferred solution, a plurality of fill lamps 110 may be uniformly provided on the circumference of the inclined installation surface.

The fill lamp 110 may have various structures. Referring to FIGS. 2 and 3 again, in a specific implementation, each of the fill lamps 110 includes a lamp body 116 and an installation base. The lamp body 116 is installed on the annular lamp holder 130 through the installation base. Specifically, the installation base may include a lamp panel 114, a lamp lens 112 and a lens cover 113. The lamp body 116 is installed on the lamp panel 114. The lamp lens 112 is provided to cover the lamp body 116. The lens cover 113 is fixedly connected to the annular lamp holder 130. The lamp lens 112 is sandwiched between the lens cover 113 and the annular lamp holder 130. Specifically, a seal 115 is provided between the lamp lens 112 and an installation hole 1313 so as to ensure the sealing of the receiving groove 1311.

Specifically, the annular lamp holder 130 is provided with an installation hole 1313. The lamp panel 114 is fixed to the inner wall of the annular lamp holder 130. The lamp body 116 is provided to extend through the installation hole 1313 and is connected to the lamp panel 114. The lens cover 113 is fixed to the outer wall of the annular lamp holder 130. The lamp lens 112 is located in the installation hole 1313. The surface of the outer wall of the annular lamp holder 130 is an inclined installation surface.

Specifically, the lamp body 116 may be an infrared lamp, and correspondingly, the lamp lens is an infrared lens. In this case, the light supplementing device 100 may provide fill light for the camera body 200 at night.

The lamp panel 114 may be fixed on the annular lamp holder 130 through a sheet metal heat dissipater 111. The sheet metal heat dissipater 111 can provide more efficient heat dissipation of the lamp panel 114 and the lamp body 116, to avoid heat accumulation in the light supplementing device 100.

Referring to FIG. 3 again, the annular lamp cover 133 may be provided with a connection tab 1333. After assembly, the light supplementing device 100 may be fixedly connected to the camera body 200 through the connection tab 1333. Specifically, the connection tab 1333 and the camera body 200 may be each provided with a connection hole. The connection tab 1333 may be fixedly connected to the camera body 200 by a threaded connector that is engaged with the connection hole.

The multi-lens camera may include a mounting plate 300, through which the overall installation may be implemented after the camera body 200 and the light supplementing device 100 are assembled. Specifically, a threaded connector 210 may be provided on the camera body 200, and a connection post 310 may be provided on the mounting plate 300. A threaded hole is provided on the connection post 310, the threaded connector 210 is fixedly engaged with the threaded hole, thereby implementing the assembly of the camera body 200 and the mounting plate 300. The assembled camera body 200 and the mounting plate 300 are then connected, as a whole, with the installation base of the multi-lens camera through the mounting plate 300.

One of the first bracket 2521 and the fixing disc 251 is provided with a first tooth slot, and the other one is provided with a first meshing tooth that is engaged with the first tooth slot. The first bracket 2521 is connected to the fixing disc 251 through the engagement between the first tooth slot and the first tooth.

In the lens regulator 250 disclosed in the embodiment of the present application, the lenses 230 are installed on the first bracket 2521, and thus can move with the first bracket 2521 on the fixing disc 251, thereby enabling adjustment of the positions of the lenses 230 on the fixing disc 251. The first bracket 2521 is connected to the fixing disc 251 by the engagement between the first tooth slot and the first tooth. During the adjustment, the operator can drive the first bracket 2521 to move with some force applied thereto. During the movement of the first bracket 2521, the first tooth slot and the first tooth move relative to each other. After the adjustment is completed (the force is withdrawn), the engagement between the first tooth slot and the first tooth can ensure that the first bracket 2521 is positioned at the adjusted position, and thus fulfill the adjustment of the lenses 230.

Compared with the prior art in which a lens is fixed by a magnet, the lens regulator 250 disclosed in the embodiment of the present application does not need to use a large magnet. Therefore, the lens regulator 250 disclosed in the embodiment of the present application can solve the problem of a large weight and a high cost in an existing multi-lens camera that uses a magnet to lock lenses.

In a specific implementation, the circular edge of the fixing disc 251 is partially or entirely provided with a first tooth slot 2511. Correspondingly, the first bracket 2521 is provided with a first meshing tooth 2521a. The first bracket 2521 is movable along the circumference of the fixing disc 251, and is thus rotatable along the circumference of the fixing disc 251. The rotation of the first bracket 2521 will drive the lenses 230 to rotate, thereby enabling adjustment of the positions of the lenses 230 on the fixing disc 251. The position adjustment occurs in a plane parallel to the fixing disc 251, and is thus the adjustment of the lenses 230 in P-direction. Of course, the first tooth slot 2511 may be provided on the first bracket 2521, and correspondingly, the first meshing tooth 2521a is provided on the fixing disc 251.

The first bracket 2521 may include an elastic connection portion 2521b; the elastic connection portion may be provided with a first meshing tooth 2521a, which is engaged with a first tooth slot 2511. It should be noted that, in the embodiment of the present application, the engagement between the first tooth slot and the first meshing tooth means that the first tooth slot and the first meshing tooth are fixed to each other without any relative movement therebetween when no external force is present. When the first tooth slot or the first meshing tooth are subjected to elastic deformation due to an external force, they are disengaged, and thus the first tooth slot and the first meshing tooth can move relative to each other. The first bracket 2521 is thus movable along the circumference of the fixing disc 251, that is, the first bracket 2521 is able to rotate along the circumference of the fixing disc 251.

The elasticity of the elastic connection portion 2521b ensures a certain flexibility in the engagement between the first tooth slot 2511 and the first meshing tooth 2521a. Under the action of an external force, the elastic connection portion 2521b is subject to an elastic deformation, such that the first meshing tooth 2521a and the first tooth slot 2511 are disengaged, such that rotation relative to each other is allowed.

The rotation of the first bracket 2521 along the circumference of the fixing disc 251 can be implemented in various manners. The first bracket 2521 may be rolled along the circumference of the fixing disc 251 through a rolling element so as to rotate. The first bracket 2521 may also slide along the circumference of the fixing disc 251 so as to rotate.

In a specific implementation, an annular slide way may be provided on the fixing disc 251. The first bracket 2521 is fixedly engaged with the annular slide way in a direction perpendicular to the disc surface of the fixing disc 251. The first bracket 2521 is slidably engaged with the fixing disc 251 along the circumference of the fixing disc 251. The fixed engagement between the first bracket 2521 and the annular slide way in a direction perpendicular to the disc surface of the fixing disc means that the first bracket 2521 cannot move relative to the fixing disc 251 in a direction perpendicular to the disc surface of the fixing disc 251, instead it is only able to rotate along the circumference of the fixing disc 251 so as to rotate.

The annular slide way may be provided on the fixing disc 251 in various manners. For example, the annular slide way may be provided on the disc surface of the fixing disc 251. Referring to FIG. 1 again, an avoidance hole 2512 is provided at the center of the fixing disc 251. Specifically, the avoidance hole 2512 may be extended through the fixing disc 251. The provision of the avoidance hole 2512 makes the entire fixing disc 251 an annular structure. The first bracket 2521 moves along the annular structure, so that the first bracket 2521 can rotate along the circumference of the fixing disc 251.

Referring again to FIGS. 7-9, the first bracket 2521 may include a connection base 2521d and a first catch 2521c. The connection base 212 is attached on a lateral surface of the fixing disc 251. The first catch 2521c is fixedly connected to the connection base 2521d, and is provided to extend through the avoidance hole 2512 to be engaged with the fixing disc 251. The connection base 2521d and the first catch 2521c are respectively engaged with both the lateral surfaces of the fixing disc 251, so that the assembly of the first bracket 2521 on the fixing disc 251 can be implemented. During the rotation of the first bracket 2521 along the circumference of the fixing disc 251, the connection base 2521d can slide relative to the lateral surface of the fixing disc 251. Similarly, the first catch 2521c can slide relative to the other lateral surface of the fixing disc 251.

The elastic connection portion 2521b may be a part of the connection base 2521d or the first catch 2521c, or may also be independent of the connection base 2521d and the first catch 2521c.

In a specific implementation, the first bracket 2521 may include a connection base 2521d and an elastic connection portion 2521b. The elastic connection portion 2521b is a first elastic arm having one end fixed on the connection base 2521d and the other end as a free end. The free end of the first elastic arm may be located outside the circular edge of the fixing disc 251. The free end of the first elastic arm can be elastically deformed relative to the connection base 2521d, so as to be disengaged therefrom to implement the relative rotation between the first bracket 2521 and the fixing disc 251.

Figure 3:
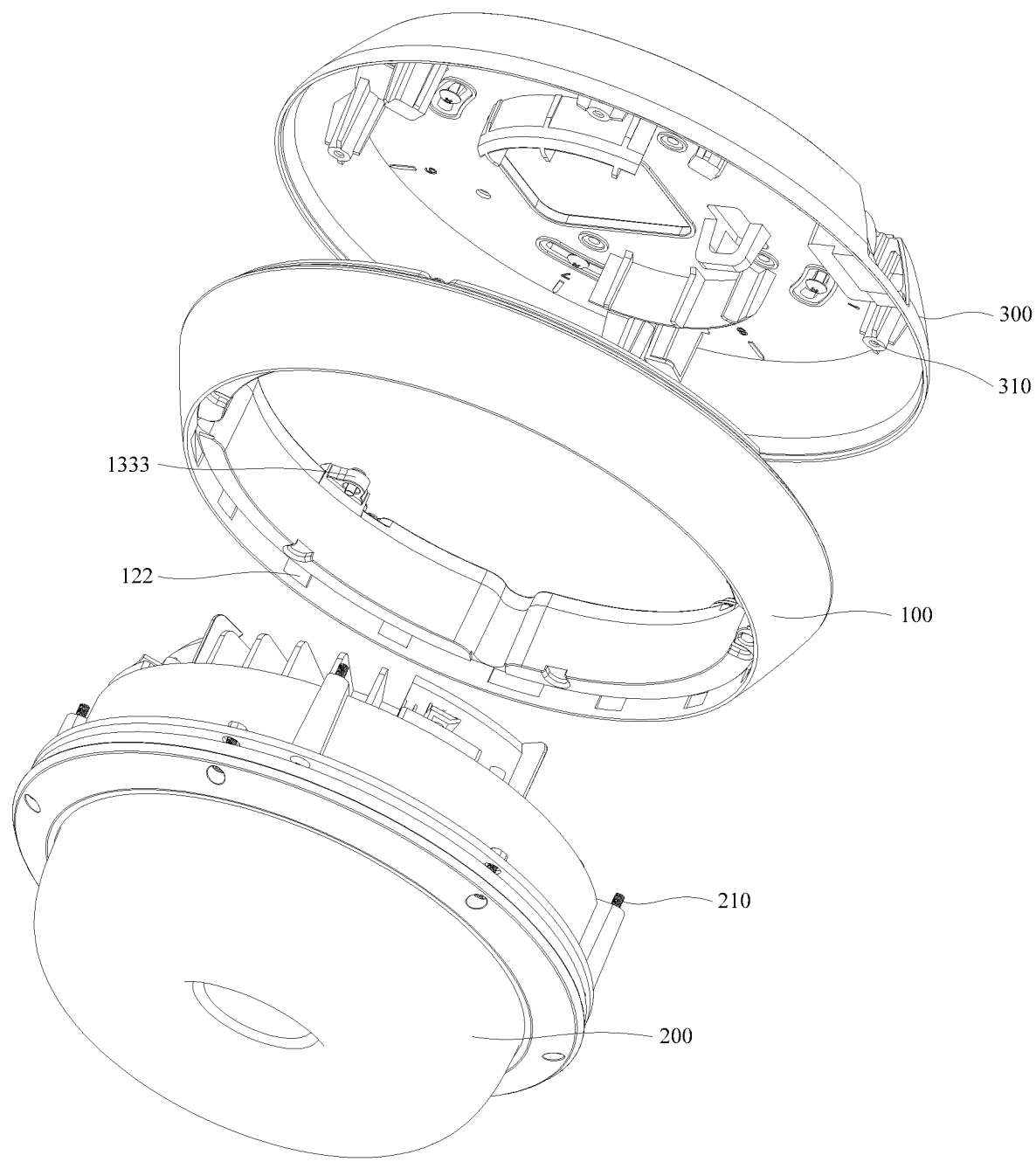
FIG. 3 is an exploded schematic view of the structure of a multi-lens camera according to an embodiment of the present application.

In order to ensure that the first bracket 2521 does not rotate when it is not subjected to an external force or is subjected to a small interference force, in a preferred solution, at least one of the first bracket 2521 and the fixing disc 251 is provided with a tightening portion that allows for tightening attachment to the other one of the first bracket 2521 and the fixing disc 251. Referring to FIG. 3, the tightening portion may include a first tightening protrusion 2521e and/or a second elastic arm 2521f. In a preferred solution, the first bracket 2521 includes a connection base 2521d that is attached to the disc surface of the fixing disc 251. The connection base 2521d has a bottom surface that is attached to the fixing disc 251. This bottom surface may be provided with the first tightening protrusion 2521e and the second elastic arm 2521f that together enable the tightening attachment between the first bracket 2521 and the fixing disc 251.

Referring to FIG. 2 again, in the embodiment of the present application, there may be a plurality of lens brackets 252 distributed along the circumference of the fixing disc 251. Specifically, the plurality of lens brackets 252 may be dispersed along the circumference of the fixing disc 251.

Referring to FIGS. 4, 6, 7 and 8, in the multi-lens camera disclosed in the embodiment of the present application, each of the lens brackets 252 includes a second bracket 2522 that is provided on the first bracket 2521. The second bracket 2522 is rotatably engaged with a lens 230 such that the lens 230 can rotate about its own axis. As such, the purpose of adjusting the lens 230 in R-direction is fulfilled.

The second bracket 2522 is rotatably provided on the first bracket 2521 and can move in a direction perpendicular to the disc surface of the fixing disc 251. Therefore, the second bracket 2522 can drive the lens 230 to perform a pitching rotation. As such, the lens 230 can be rotatably adjusted in a direction perpendicular to the disc surface of the fixing disc 251, i.e., in T-direction.

Herein, the technical features in the various preferred solutions may be combined to obtain a solution as long as they do not contradict with each other, and all of these solutions fall within the scope of the present disclosure.

Herein, in the description of the various preferred solutions, emphasis are placed on the differences therebetween. The various preferred solutions may be combined as desired as long as no confliction occurs. The embodiments obtained from the combination also fall within the scope of the present application. For simplicity, detailed description of the embodiments obtained from the combinations is not provided.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover a non-exclusive inclusion, such that processes, methods, articles, or devices including a series of elements include not only those elements listed but also those not specifically listed or the elements intrinsic to these processes, methods, articles, or equipment. Without further limitations, elements defined by the sentences "include(s) a . . . " or "include(s) a . . . " do not exclude that there are other identical elements in the processes, methods, articles, or devices which include these elements.

The embodiments in the specification are all described with reference to each other. The same or similar parts among the embodiments may refer to each other, and each embodiment focuses on the difference from other embodiments.

What has been described above are merely preferred embodiments of the application, and are not used to limit the application. Any modification, equivalent replacement or improvement made within the spirit and principle of the application falls within the scope of protection of the application.

The invention claimed is:

1. A multi-lens camera, comprising a camera body and a light supplementing device; wherein, the camera body comprises a body shell assembly, lenses, a lens regulator, and a transparent cover that is installed on the body shell assembly; the lens regulator is installed within a space formed by the body shell assembly and the transparent cover; the transparent cover comprises a flat portion and a curved portion surrounding the flat portion; the lenses are located within a space covered by the curved portion; the lens regulator comprises a fixing disc and at least two lens brackets;

each of the lens brackets comprises a first bracket configured for mounting a lens; the first bracket is movably provided on the fixing disc, and is movable along the circumference of the fixing disc; the light supplementing device is provided around outside of the camera body to provide fill light, wherein, the light supplementing device comprises a plurality of fill lamps, each of the fill lamps comprises a lamp body and an installation base; the installation base comprises a lamp panel, a lamp lens and a lens cover; the lamp body is installed on the lamp panel; the lamp lens is provided to cover the lamp body.

2. The multi-lens camera of claim 1, wherein, an annular optically transparent cover and an annular lamp holder to be installed on the camera body; wherein, the annular lamp holder is sleeved outside the plurality of lenses, and has an annular inclined installation surface along the circumference of which the plurality of fill lamps are distributed, and the annular optically transparent cover is provided to cover the plurality of fill lamps;

wherein, one of the first bracket and the fixing disc is provided with a first tooth slot, and the other is provided with a first meshing tooth; the first bracket is connected to the fixing disc through an engagement between the first tooth slot and the first meshing tooth;

or wherein, an annular slide way is provided on the fixing disc; the first bracket is fixedly engaged with the annular slide way in a direction perpendicular to the fixing disc, and is movable along the circumference of the fixing disc;

or wherein, at least one of the first bracket and the fixing disc is provided with a tightening portion, which allows for tightening attachment to the other one of the first bracket and the fixing disc.

3. The multi-lens camera of claim 2, wherein, the annular lamp holder comprises an annular base and an annular lamp cover; the annular base is provided with a receiving groove, and the annular lamp cover is provided to sealingly cover an opening of the receiving groove; and fill cables connected to the fill lamps are arranged in the receiving groove;

or wherein, the annular optically transparent cover is arranged on the annular lamp holder; and a positioning groove is provided at a bottom of an inner wall of the annular optically transparent cover, which is engaged with the bottom of the annular lamp holder for positional restriction.

4. The multi-lens camera of claim 3, wherein, the annular lamp holder further comprises an annular gasket, through which the annular lamp cover is sealingly connected to the annular base.

5. The multi-lens camera of claim 4, wherein, the annular lamp cover and the annular gasket each is provided with a threading hole for allowing passage of the fill cables; a sealing cable clip, which is sealingly engaged with the threading hole and through which the fill cables extend, is provided at the threading hole.

6. The multi-lens camera of claim 3, wherein, a cable clip configured to fix the fill cables is provided within the receiving groove.

7. The multi-lens camera of claim 3, wherein, the annular base comprises an annular inner wall and an annular outer wall, which are connected at one end and obliquely extended away from each other at the other end.

8. The multi-lens camera of claim 7, wherein, the annular base has a V-shaped cross section, and the receiving groove is V-shaped.

9. The multi-lens camera of claim 3, wherein, the positioning groove is an annular groove provided with a plurality of drain notchs on its circumference.

10. The multi-lens camera of claim 2, wherein, the plurality of fill lamps are uniformly provided on a circumference of the inclined installation surface.

11. The multi-lens camera of claim 2, wherein, the lens cover is fixedly connected to the annular lamp holder; and the lamp lens is sandwiched between the lens cover and the annular lamp holder.

12. The multi-lens camera of claim 11, wherein, the annular lamp holder is provided with an installation hole; the lamp panel is fixed to an inner wall of the annular lamp holder; the lamp body is provided to extend through the installation hole and is connected to the lamp panel; the lens cover is fixed to an outer wall of the annular lamp holder; the lamp lens is located in the installation hole; the surface of the outer wall of the annular lamp holder is the inclined installation surface.

13. The multi-lens camera of claim 12, wherein, the lamp panel is fixed on the annular lamp holder through a sheet metal heat dissipater; or, the lamp body is an infrared lamp and the lamp lens is an infrared lens.

14. The multi-lens camera of claim 2, wherein, a circular edge of the fixing disc is partly or entirely provided with the first tooth slot; the first bracket is provided with the first meshing tooth, and is movable along the circumference of the fixing disc.

15. The multi-lens camera of claim 14, wherein, the first bracket comprises an elastic connection portion; the elastic connection portion is provided with the first meshing tooth, which is elastically engaged with the first tooth slot.

16. The multi-lens camera of claim 15, wherein, the first bracket comprises a connection base and the elastic connection portion; the elastic connection portion is a first elastic arm having one end fixed on the connection base, and the other end located outside the circular edge as a free end.

17. The multi-lens camera of claim 2, wherein, an avoidance hole is provided at the center of the fixing disc.

18. The multi-lens camera of claim 17, wherein, the first bracket comprises a connection base and a first catch; the connection base is attached on a lateral surface of the fixing disc; the first catch is fixedly connected to the connection base, and is provided to extend through the avoidance hole to be engaged with the fixing disc.

19. The multi-lens camera of claim 2, wherein, the tightening portion comprises a first tightening protrusion and/or a second elastic arm.

20. The multi-lens camera of claim 19, wherein, the first bracket comprises a connection base that is attached to a disc surface of the fixing disc; the connection base has a bottom surface attached to the fixing disc; and the bottom surface is provided with the first tightening protrusion and the second elastic arm.

* * * * *